Figure 1:
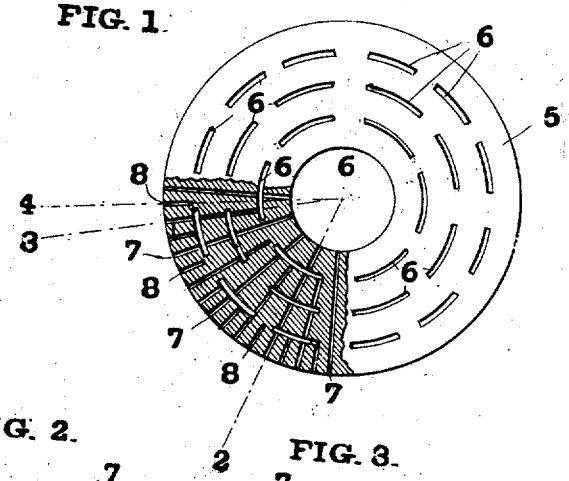

No. 12,660.

REISSUED JUNE 11, 1907.

H. MAXIM.

CARTRIDGE.

APPLICATION FILED SEPT. 8, 1902.

2 SHEETS—SHEET 1.

Witnesses

Chas. K. Davies.

Wm. B. Kerkam

Inventor

Hudson Maxim by Philip Lawrence

Attorney

No. 12,660.

REISSUED JUNE 11. 1907.

H. MAXIM.

CARTRIDGE.

APPLICATION FILED SEPT. 8, 1902.

2 SHEETS—SHEET 2.

Witnesses
Chas. K. Davis.
[illegible] B. Norkam

Inventor
Hudson Maxim,
by Chas. Kauro
Attorney

UNITED STATES PATENT OFFICE.

HUDSON MAXIM, OF BROOKLYN, NEW YORK.

CARTRIDGE.

No. 12,660. Specification of Reissued Letters Patent. Reissued June 11, 1907.

Original application filed August 24, 1899, Serial No. 728,304. Divided and application filed April 23, 1901, Serial No. 57,153. Original No. 677,523, dated July 2, 1901. Application for reissue filed September 3, 1902. Serial No. 122,604.

*To all whom it may concern:*

Be it known that I, HUDSON MAXIM, a resident of Brooklyn, New York, have invented a new and useful Improvement in Cartridges, which invention is fully set forth in the following specification.

My present application is a division of my application Sr. No. 728,304, filed August 24, 1899.

The invention relates to cartridges, and more particularly to the explosive charge of the cartridge, with special reference to the construction of the units of explosive material from which said charge is or may be built up. High explosives, such as guncotton, explode by wave action or detonation rather than by surface combustion of the charge, and therefore the gases of explosion are all generated instantaneously, and thus subject the gun to destructive strains, while on the other hand certain explosives, such as smokeless powder, are consumed from surface combustion only, and as a result lend themselves readily to the construction of accelerating cartridges. In the use of the latter class of explosives, however, it is essential that the combustion of the charge should be uniformly accelerated in order to avoid undue strain upon the gun and at the same time secure the highest ballistic effects. Furthermore, in order to secure the full benefit of all the explosive comprising the charge it is essential that completion of combustion should occur simultaneously throughout every part of the charge, as otherwise particles of unconsumed explosive will be blown from the gun and wasted. In addition to these essential requirements it is desirable in many cases to secure the maximum density of loading to the end that the maximum quantity of explosive may be gotten into the powder-chamber of the gun, and it is also frequently desirable to have a stiff or rigid charge of explosive that may be readily handled with the projectile carried therein or attached bodily thereto.

One of the main objects of the present invention is to provide an explosive charge for a cartridge in which the combustion of the charge shall be uniformly accelerated and the completion of the combustion occur simultaneously throughout the entire mass of the explosive.

A further object is to secure accelerated and simultaneously-completed combustion in an explosive charge capable of maximum density of loading, when this is desired, and to provide a charge of such rigidity as to facilitate the loading operations or to enable the charge itself to support the projectile without the employment of a cartridge-shell for that purpose, and, finally, the invention has for its object to generally improve the construction of explosive charges for cartridges.

With these objects in view the invention consists of an accelerating explosive charge composed of a single unit or a plurality of suitably-assembled units of explosive material, each of which units consists of an integral mass of explosive which explodes as the result of surface combustion, preferably in the form of rods or bars, and having a plurality of longitudinal perforations constituting flame passages so arranged as to provide substantially equal thicknesses of material between the several perforations and a plurality of uniformly-disposed lateral vents for said longitudinal perforations.

By forming the explosive as an integral mass, with equal thicknesses of material between the several longitudinal perforations, I secure uniformly-accelerated and simultaneously-completed combustion throughout the mass of explosive, and by providing the uniformly-disposed lateral vents I guard against the disruption and shattering into fragments of the mass of explosive by the pressure of the gases within the longitudinal perforations which shattering action is particularly liable to occur in long rods. By long rods as herein used, both in the description and claims, is meant rods whose length is such that the gases of combustion generated in the perforations are unable to escape from the ends of the perforations as fast as the gases are generated. In such long rods, the result of the failure of the gases to escape as rapidly as generated is that there is a rapidly increasing internal pressure within the perforations which ultimately results in the bursting or shattering of the rod. These lateral vents not only serve as channels for the escape of the gases from the longitudinal perforations to the exterior of the mass of explosive, but they each afford a burning-surface as well. Nevertheless by uniformly disposing the vents with relation to the longitudinal perforations and to each other I am enabled to secure their venting action without disturbing the conditions of uniformly-accelerated and simultaneously-completed combustion, which, as before stated, it is essential to secure. As mentioned above, the charge for a cartridge may consist of a single unit of the explosive material thus formed or it may consist of a plurality of such units suitably united; but whether the charge be composed of a single unit or a plurality of such units the uniformly-accelerated and simultaneously-completed combustion will in all cases be secured. Preferably these units of explosive material are in the form of rods or bars of smokeless powder, the longitudinal perforations being formed in the act of forming the rod or bar by stuffing the material through dies when in a plastic condition and the lateral vents being subsequently formed while the material is yet plastic. These rods or bars when suitably dried and freed from the solvent usually employed to render the explosive plastic may have their surfaces coated with a non-explosive material, thereby confining the combustion of the charge within the longitudinal perforations and lateral vents. In the absence of such non-explosive coating the thickness of material between the outer surface of the rod or bar and those longitudinal perforations lying nearest such outer surface may be substantially equal to the thickness of material between the several perforations without interfering with the simultaneous completion of combustion heretofore referred to. When the non-explosive coating is applied to the exterior surface of the rod or bar, however, the thickness of material between such outer surface and the longitudinal perforations lying nearest such surface should be but one-half of that of the material between the several perforations. In the non-coated rod the material between the outer surface and the perforations burns in two directions the same as it does between two perforations, whereas in the coated rod the material between the outer surface and the perforations burns in but one direction—viz., outwardly from the perforations—and hence, the thickness of material between such surface and perforations is but one-half that between the perforations. In addition to the lateral vents, extending from the longitudinal perforations to the exterior surface of the rod or bar, I sometimes form cells in the body of the material, which cells are open at one end only. This cell construction is particularly useful in some cases where the teral vents for the longitudinal perforations are radial to the rod or bar, and hence have a constantly-increasing thickness of material between the vents in an outward direction. In such cases by interposing the cells between the radial vents the thickness of material between burning-surfaces may be maintained substantially uniform at all points.

Figure 2:
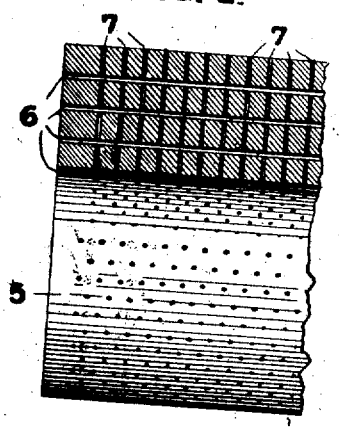
Figure 3:
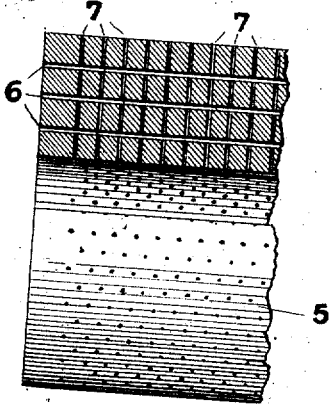
Figure 4:
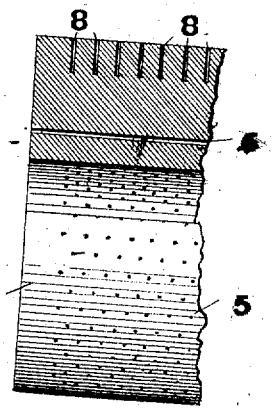
Figure 9:
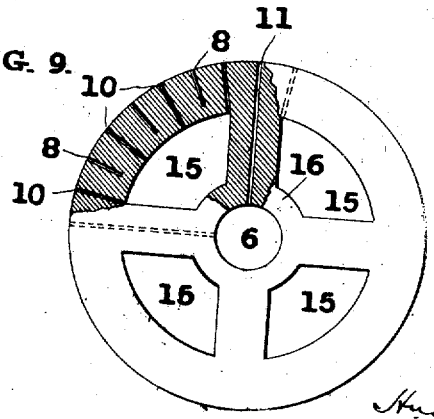
Figure 5:
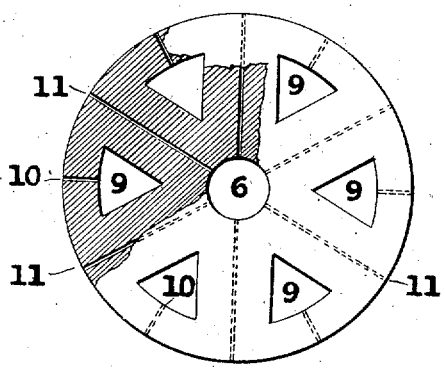
Figure 6:
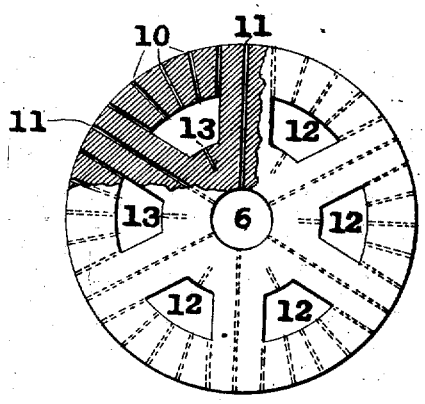
Figure 7:
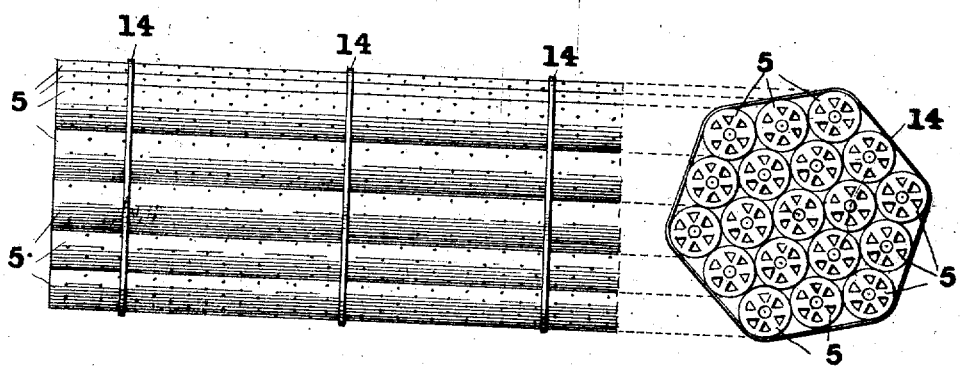
Figure 8:
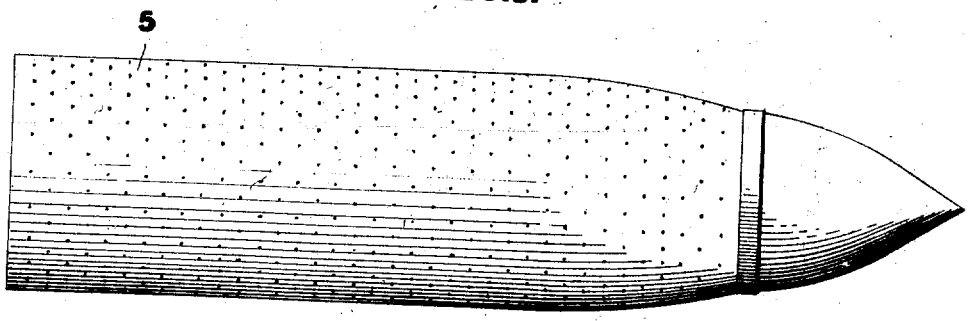

The inventive idea involved in my explosive charge may receive various mechanical expressions, some of which I have illustrated in the accompanying drawings, in which Figure 1 is an end elevation, partly in broken section, of a rod of explosive material embodying my invention. Fig. 2 is a broken longitudinal section on the radial line 2, Fig. 1. Figs. 3 and 4 are like views on the radial lines 3 and 4, Fig. 1, respectively. Figs. 5 and 6 are end elevations, partly in section, showing modified forms of perforations. Fig. 7 is a view on a reduced scale of a plurality of said rods or bars assembled to form a single charge, and Fig. 8 is a like view of a single rod or bar forming the entire charge and attached to and supporting the projectile. Fig. 9 is a view of another modification.

Referring to Figs. 1, 2, 3 and 4, 5 is a mass of explosive material, preferably a colloidal smokeless powder, here shown in the form of a cylindrical rod or bar, which mass 5 is provided with a plurality of longitudinally-extending channels or perforations 6, so disposed throughout the mass of the explosive as to provide substantially equal thickness of the material between the several longitudinal perforations and between the exterior surface of the mass 5 and the outer series of perforations 6. Each of the longitudinal perforations 6 is provided with a plurality of lateral vents 7, here shown as extending radially from the outer surface of the rod or bar to the central perforation 6, and in doing so may transect one, two or more of the perforations 6, as will be understood from an inspection of Figs. 1 and 2, while other lateral vents 7 do not extend as far inward as the central perforation 6, and in their course may transect one, two, or more of the other longitudinal perforations. In Fig. 2, I have shown a series of these lateral vents 7, extending from the central perforation 6 and transecting three of the other longitudinal perforations, while in Fig. 3 is shown a series of lateral vents which cut three of the longitudinal perforations, but do not extend to the central perforation. In Fig. 4 is shown a series of cells 8, extending from the exterior surface of the rod or bar a short distance into the mass of explosive, but without cutting any of the longitudinal perforations 6. By reference to Fig. 1 it will be seen that these cells 8 are located at points along the surface where no lateral vents 7 occur, and where in the absence of the cells 8 the distances between the outer ends of the radially-extending vents would cause a thickness of material greater than the substantially uniform thickness from point to point of burning-surfaces which is maintained throughout the mass of explosive material. It is not to be understood that the longitudinal perforation 6, Fig. 4, is not vented by lateral vents, but only that the cells 8 do not cut any perforations 6. By inspection of Fig. 1 it will be seen that the radial section-lines 3 and 4 both cut one of the perforations 6 adjacent to the inner perforations and that the perforation so cut is vented through the series of vents 7 shown in Fig. 3. The longitudinal perforations 6 need not necessarily be of the form shown in Fig. 1, but may be of any form in cross-section desired, as cylindrical, triangular, or otherwise.

In Figs. 5 and 6 I have shown rods or bars of smokeless powder, in which the longitudinal perforations surrounding the central perforations differ in form from those shown in Fig. 1. In Fig. 5 the longitudinal perforations 9 are symmetrically disposed around the central perforation 6. These outer perforations 9 may have walls parallel with the adjacent perforations and with the exterior of the rod. As shown, these perforations are three-sided, with their apices toward the center, and have lateral vents 10, while lateral vents 11 extend radially from the central cylindrical perforation 6 to the exterior of the rod or bar. Fig. 6 illustrates a rod or bar of the explosive material similar to that shown in Fig. 5, except that the six outer perforations 12 are four-sided, being provided with a wall parallel with the central circular perforation 6. In this form the lateral vents 10 and 11 extend outward from the respective longitudinal perforations, as in Fig. 5, and in some instances I also form cells 13, which extend from the inner wall of the perforations 12 toward or even into the central perforation 6.

In Fig. 9 I have shown a rod or bar of explosive having the central longitudinal perforation 6 and four symmetrically-arranged longitudinal perforations 15, whose cross-sectional area exceeds that of the perforations of the forms shown in Figs. 1, 5 and 6. These large perforations 15 afford a more ready escape for the gases lengthwise of the rod or bar than do the smaller perforations 6 of Fig. 1, 9 of Fig. 5, or 12 of Fig. 6; but, on the other hand, the density of loading is not so great with the form shown in Fig. 9 as with those in Figs. 1, 5 and 6. In Fig. 9 the web or wall of material between perforations 6 and 15 is not provided with cells or lateral vents, and hence the thickness of said wall if made substantially equal to that between any other two adjacent burning-surfaces—as, for example, that between vent 11 and the wall of perforation 15 or vent 10 or between vents 10 and cells 8—thereby insuring the simultaneous completion of the combustion of the entire rod or bar. In fact, in all of the forms the dimensions, relative arrangement of the longitudinal perforations, the lateral vents, and the cells are such as to provide a uniform thickness of material between them, to the end that the completion of combustion may occur simultaneously throughout the mass of the explosive. Moreover, the best results are obtained if the thickness of material between the several vents, or between a vent and a perforation, be maintained substantially the same as that between other burning-surfaces, thereby contributing to the simultaneous completion of the combustion of the entire charge.

If the entire charge is to be composed of a single unit or integral mass 5 of the explosive, it may be employed separate from the projectile or it may be fixedly attached thereto, as shown in Fig. 8, thereby securing the advantages of fixed ammunition without employing a cartridge-shell; but whether attached to or separate from the projectile the mass of explosive material will be provided with the uniformly-disposed internal longitudinal flame passages having equal thicknesses of material between them, said flame passages having a plurality of uniformly-disposed lateral vents, as hereinbefore described. If desired, a plurality of these units or integral masses 5, 5, may be assembled to form a charge, as shown in Fig. 7, said units being preferably arranged symmetrically and secured by any suitable binder, as a cord 14. When the rods are of the length shown in this Fig. 7, in which their length many times exceeds their diameter, it is of the utmost importance to provide the lateral vents for the internal longitudinal flame passages.

When it is desired to secure the minimum surface exposed to the flame of ignition combined with the maximum acceleration, the longitudinal perforations may be minute in character and circular in cross-section, as shown in my United States Patent No. 540,327, such perforations being, of course, provided with uniformly-disposed lateral vents, as hereinbefore described.

It is of importance that the material be in the form of an integral mass or unit of explosive and that its character as such integral unit or mass be maintained until the instant of complete combustion in order that the acceleration of the combustion may be preserved until the explosive is entirely burned. Any breaking or shattering of the mass or unit into smaller particles would cause instantaneous instead of progressive combustion. The pressure of the gases confined in the longitudinal perforations would be such as to thus shatter the unit or mass of the explosive if the gases were not allowed to escape through the lateral vents. These vents, however, not only act as channels for the escape of the gas from the longitudinal perforations, but they also supply increased burning-surfaces to the flame of ignition, as before described, and it is therefore best that these lateral vents be uniformly disposed in order that they may not interfere with the simultaneous completion of the combustion, which as before stated is essential.

What I claim is:

1. An integral mass or unit of explosive material in the form of a rod or bar provided with a plurality of longitudinal perforations each of which has a plurality of lateral vents.

2. An integral mass or unit of explosive material in the form of a rod or bar provided with a plurality of uniformly-disposed longitudinal perforations, and a plurality of lateral vents transecting a plurality of said longitudinal perforations.

3. An integral mass or unit of explosive material in the form of a rod or bar provided with a plurality of longitudinal perforations, and a plurality of uniformly-disposed lateral vents transecting a plurality of said longitudinal perforations.

4. An integral mass or unit of explosive material in the form of a rod or bar provided with a plurality of longitudinal perforations so disposed as to present substantially equal thicknesses of material between all the burning-surfaces, and a plurality of uniformly-disposed lateral vents for said longitudinal perforations.

5. An integral mass or unit of explosive material provided with a central longitudinal perforation and a plurality of other longitudinal perforations arranged around said central perforation, and a plurality of lateral vents which act to simultaneously vent both the central and the other longitudinal perforations.

6. An integral mass or unit of explosive material provided with a central longitudinal perforation and a plurality of other longitudinal perforations symmetrically arranged around said central perforation, and a plurality of lateral vents extending from said central perforation and transecting one or more of the other longitudinal perforations.

7. An integral mass or unit of explosive material provided with a plurality of longitudinal perforations, a plurality of lateral vents to said longitudinal perforations and a plurality of laterally-opening cells.

8. An integral mass or unit of explosive material provided with a plurality of longitudinal perforations, a plurality of uniformly-disposed lateral vents to said longitudinal perforations, and a plurality of uniformly-disposed laterally-opening cells.

9. A cartridge-charge consisting of a bundle or fagot of integral units of explosive material in the form of rods or bars provided with a plurality of uniformly-disposed longitudinal perforations and a plurality of lateral vents transecting a plurality of said longitudinal perforations.

10. An integral mass or unit of explosive material in the form of a rod or bar provided with a plurality of longitudinal perforations so disposed as to present substantially equal thicknesses of material between the perforations, each of which longitudinal perforations has a plurality of lateral vents.

11. A cartridge-charge consisting of a bundle or fagot of integral units of explosive material in the form of rods or bars provided with a plurality of longitudinal perforations each of which longitudinal perforations has a plurality of lateral vents.

12. A cylindrical integral rod or bar of explosive material having a plurality of longitudinal perforations each of which has a burning-surface concentric with the rod or bar, and a plurality of lateral vents for said longitudinal perforations.

13. An integral rod or bar of explosive material having a central longitudinal perforation and a plurality of other longitudinal perforations, each of which has a burning-surface parallel with some part of the burning-surface of the central perforation, and a plurality of lateral vents for said longitudinal perforations.

14. An integral mass of explosive material formed in the shape of a long rod having radial multi-perforations, and a plurality of internal flame passages intercepting a plurality of said multi-perforations.

15. An integral mass of explosive material formed in the shape of a long rod having radial multi-perforations, and a plurality of longitudinally extending internal flame passages intercepting a plurality of said multi-perforations.

16. A mass or unit of explosive material of uninterrupted continuity in the form of a long rod provided with a plurality of internal, longitudinal transversely multi-vented flame passages.

17. A mass or unit of explosive material of uninterrupted continuity in the form of a long rod provided with one or more internal longitudinal flame passages each of which has a plurality of transverse vents.

18. A mass or unit of explosive material of uninterrupted continuity formed in the shape of a long rod having multi-longitudinal internal flame passages, and a plurality of transverse vents intercepting a plurality of said flame passages.

In testimony whereof I have signed this specification in the presence of two subscribing witnesses.

HUDSON MAXIM.

Witnesses:
S. T. CAMERON,
C. A. L. MASSIE.